United States Patent

Burch

[11] Patent Number: 5,946,796
[45] Date of Patent: Sep. 7, 1999

[54] STATOR WIRE FORMING TOOL

[75] Inventor: Jerry C. Burch, Northridge, Calif.

[73] Assignee: Labinal Components & Systems, Inc.

[21] Appl. No.: 08/970,337

[22] Filed: Nov. 14, 1997

Related U.S. Application Data

[60] Provisional application No. 60/030,978, Nov. 15, 1996.

[51] Int. Cl.[6] .................................................. B23P 19/00
[52] U.S. Cl. ............................... 29/736; 29/596; 140/92.1
[58] Field of Search ............................. 29/596, 758, 732, 29/736; 140/71 R, 92.1

[56] References Cited

U.S. PATENT DOCUMENTS

| | | | |
|---|---|---|---|
| 2,506,173 | 5/1950 | Polard | 29/205 |
| 3,184,173 | 5/1965 | Walling | 242/1.1 |
| 3,389,865 | 6/1968 | Stuckey | 242/1.1 |
| 4,053,111 | 10/1977 | Eminger | 242/1.1 |
| 4,106,189 | 8/1978 | Peters | 29/736 |
| 5,113,573 | 5/1992 | Taji et al. | 29/596 |
| 5,218,752 | 6/1993 | Hensel et al. | 29/736 |
| 5,594,984 | 1/1997 | Kieffer et al. | 29/736 |
| 5,657,530 | 8/1997 | Kawamura et al. | 29/596 |

*Primary Examiner*—Lee W. Young
*Assistant Examiner*—Davide Caputo
*Attorney, Agent, or Firm*—Biebel & French

[57] ABSTRACT

A tool for forming wire windings located in stator slots defined between radially extending stator teeth. The tool includes a fixture supporting a plurality of elongated fingers wherein each finger includes a plurality of sections spaced longitudinally along the finger, each section defining a width dimension different from the width dimension of an adjacent section. The width dimensions of the sections progressively increase from a distal end of the finger to a proximal end of the finger. A linear actuator is provided for moving the fixture toward and away from a stator whereby the fingers are inserted between the teeth in the stator to cause wire wound around the teeth to be pressed against the teeth.

11 Claims, 4 Drawing Sheets

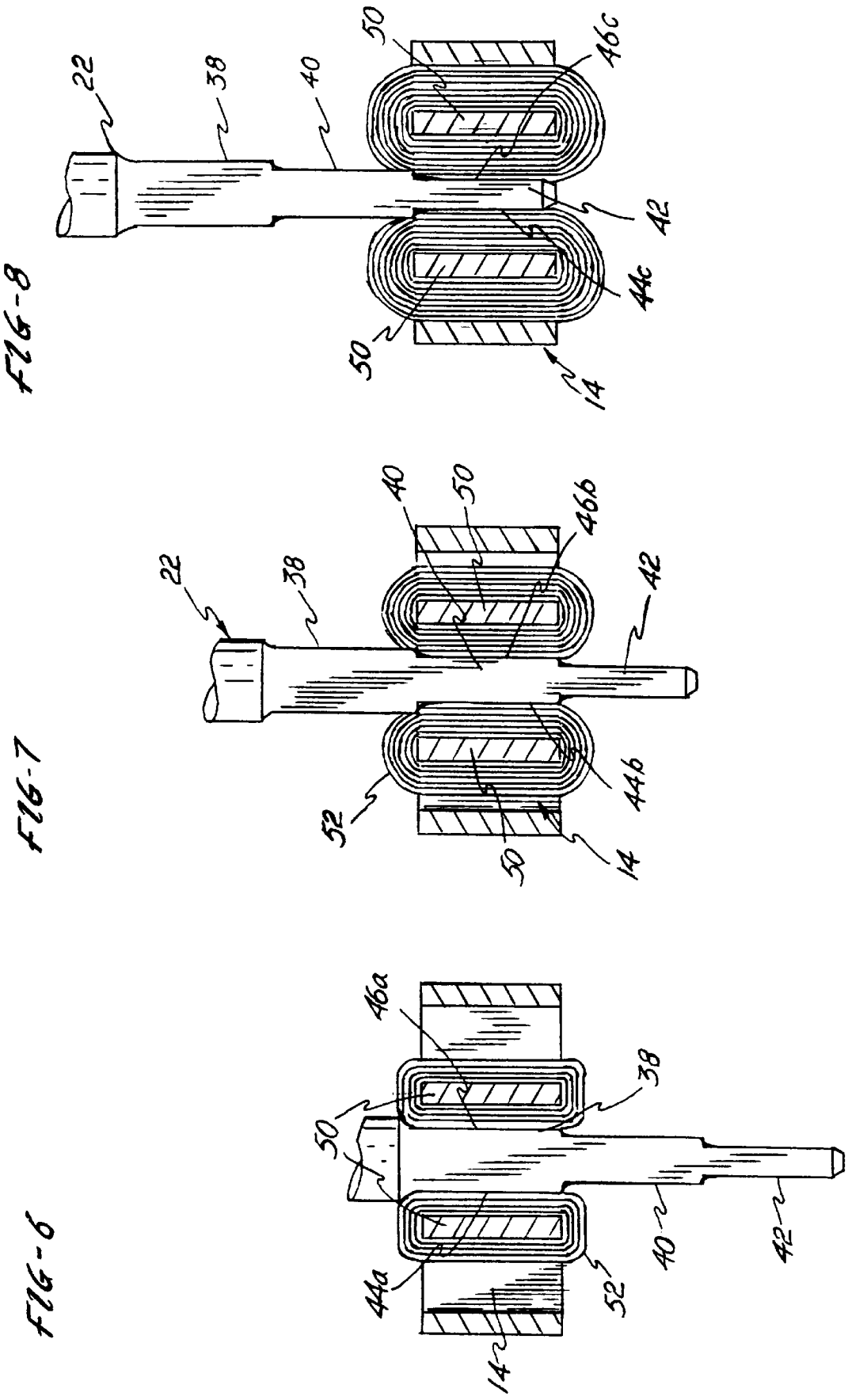

STATOR WIRE FORMING TOOL

CROSS-REFERENCE TO RELATED APPLICATION

This application claims the benefit of U.S. Provisional application Ser. No. 60/030,978, filed Nov. 15, 1996.

BACKGROUND OF THE INVENTION

1. Field of the Invention

The present invention relates generally to stator winding and, more particularly, to a tool and method for use in stator winding to facilitate pressing wire against the teeth of a stator during a winding operation.

2. Related Prior Art

Field winding coils for stators are generally placed on the radially inwardly extending teeth of a stator by either preforming the coils and then pressing the preformed coils over the stator teeth, or by winding the coils directly onto the stator teeth. In the process where the coils are preformed, the coils are pushed onto the stator by a coil pusher which forcibly pushes the coils over the teeth of the stator, and a forming tool, or forming tools, may be provided to shape the wire in the stator slots and around the ends of the teeth in order to compactly position the coils on the stator. In such a construction, excess wire must be provided for the preformed coils in order to accommodate the necessary distortions of the coils as they are pressed over and around the stator teeth. Accordingly, such a construction has been found to provide an inefficient amount of wire, as well as result in a larger stator dimension as a result of the excess coil wire extending around the end faces of the teeth for the stator.

In the alternative process for providing field windings, wire is fed from a winding spindle directly onto a stator wherein the wire is successively wound around the stator teeth, and the efficiency of the winding operation is substantially dependent on the ability to direct the wire to desired locations on the teeth as it is fed from the winding spindle. For example, such a winding operation often incorporates various structures to guide the wire to desired locations in the slots throughout the winding process. However, it has been found that even with guiding of the wire to desired locations in the slots, the wire formed around adjacent teeth defining each slot does not necessarily lie in close contact with the teeth such that the number of windings that may be placed around the teeth is limited by the efficiency of the wire placement in the slots.

SUMMARY OF THE INVENTION

The present invention provides a tool for use in a stator winding process wherein the tool is adapted to press wire coils up against the teeth of the stator at predetermined stages of the winding operation. In particular, the present tool is adapted to be used in a winding operation wherein individual wire coils are wound around individual teeth of a stator, and provides a clearance space through the slot between the teeth during a winding operation.

In one aspect of the invention, the tool includes an elongated finger having a proximal end and a distal end, and the finger defines a cross section having a width dimension and a radial dimension perpendicular with the width dimension. A plurality of longitudinally extending sections are defined along the length of the finger wherein each of the sections has a width dimension different from the width dimension of an adjacent section. In addition, the width dimension or cross sectional area of each section is successively greater than an adjacent section in a direction from the distal end to the proximal end of the tool.

Thus, the elongated finger of the tool is moved through a slot between the teeth in order to push the wire located around the teeth in a circumferential direction to ensure that the area of the slot remains clear to permit additional wire to pass into the slot and be wound around the teeth. In order to conform to the shape of the slot, the finger is formed with a pair of side surfaces spaced apart in the direction of the width dimension, and the side surfaces converge toward each other in the direction of the radial dimension such that the cross section of the finger is substantially wedge shaped.

In a preferred embodiment, a plurality of elongated fingers are supported from a fixture. A linear actuator is provided including a bracket supporting the fixture for actuating the fixture toward and away from the stator whereby the fingers are inserted between teeth in the stator to cause wire wound around the teeth to be pressed against the teeth.

Initially, the widest dimension of the elongated fingers is inserted through the stator into engagement with the wire therein. At subsequent stages of the winding process, successively smaller width sections of the fingers are inserted to accommodate the decreasing slot area as more wire is wound around the teeth.

Therefore, it is an object of the present invention to provide a tool including an elongated finger member for passing through slots in a stator and press wire into a desired position.

It is a further object of the invention to provide a tool having elongated fingers including distinct sections having different cross sectional areas to accommodate different spacings between wire located in the stator slots.

It is yet another object of the invention to provide a method of using such a tool wherein successive sections of the tool are brought into contact with wire within the slots of the stator, depending on the amount of wire filling the slots between the stator teeth.

Other objects and advantages of the invention will be apparent from the following description, the accompanying drawings and the appended claims.

BRIEF DESCRIPTION OF THE DRAWINGS

FIGS. 6 through 8 are partial cutaway views showing the relationship of one of the fingers of the tool relative to the windings of a stator through a sequence of wire forming operations.

DETAILED DESCRIPTION OF THE PREFERRED EMBODIMENT

Figure 1:
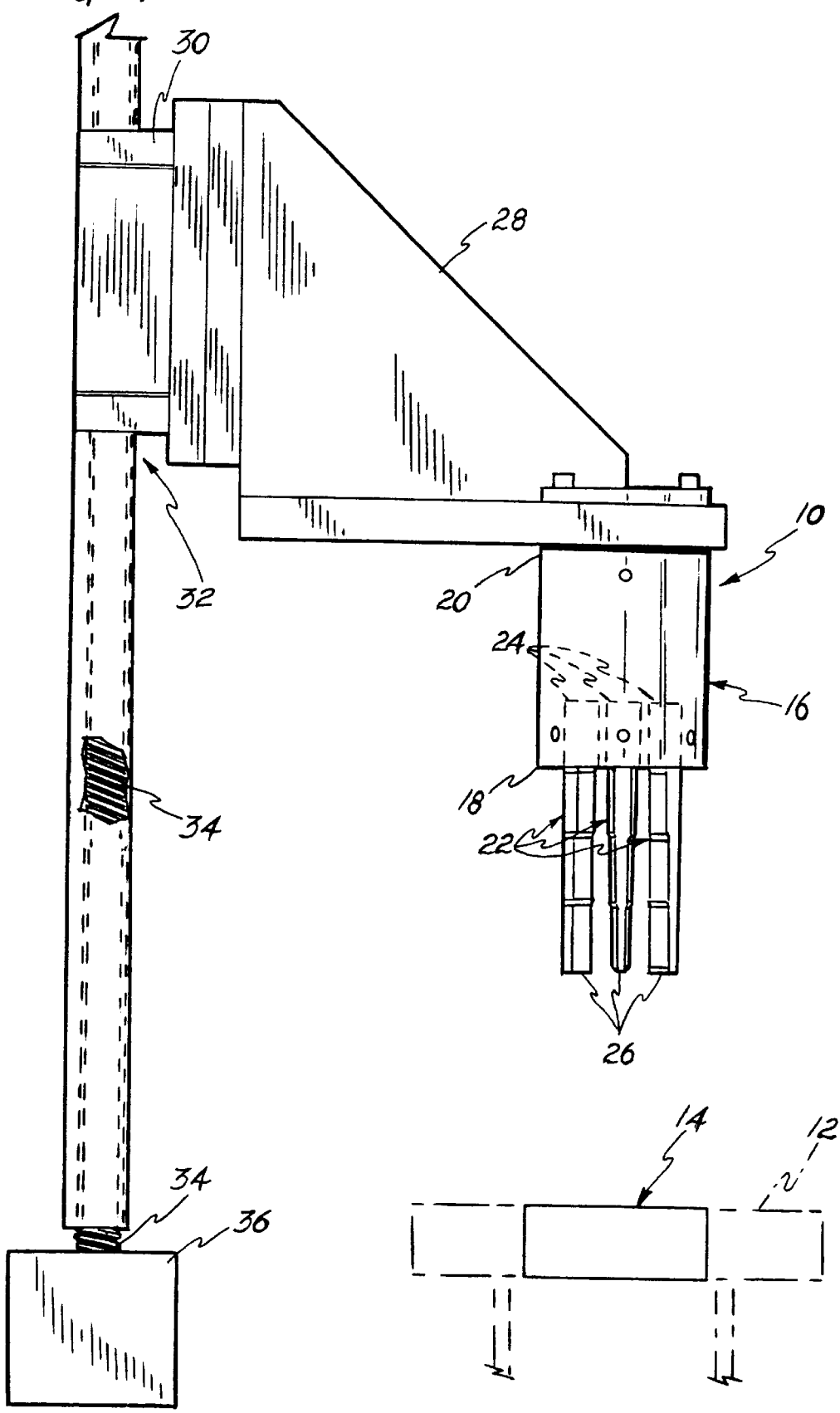
FIG. 1 is a side elevational view illustrating the tool of the invention located in a stator winding apparatus.

Referring to FIG. 1, the present invention comprises a tool 10 for forming wire windings located in stator slots defined between radially extending stator teeth wherein the tool is shown in relation to a stator winding apparatus. The winding apparatus includes a stator support, shown diagrammatically as 12 supporting a stator 14 for a winding operation.

The tool 10 of the present invention includes a cylindrical fixture 16 defining a proximal end 18 and a distal end 20. A plurality of elongated fingers 22 extend from the proximal end 18 of the fixture 16 wherein each of the fingers 22 includes a proximal end 24 supported in the proximal end of the fixture 16, and a distal end 26 opposite from the proximal end 24.

The fixture 16 is mounted to a bracket 28 supported on a vertically movable carriage 30 of a linear actuator 32. The carriage 30 is threadably engaged with a lead screw 34, and the lead screw 34 is actuated for rotating movement by a computer controlled servo motor 36. Thus, actuation of the servo motor 36 causes vertical movement of the carriage 30 and resultant vertical positioning of the fixture 16 whereby the elongated fingers 22 are actuated for precise movement toward and away from the stator 14.

Figure 2:
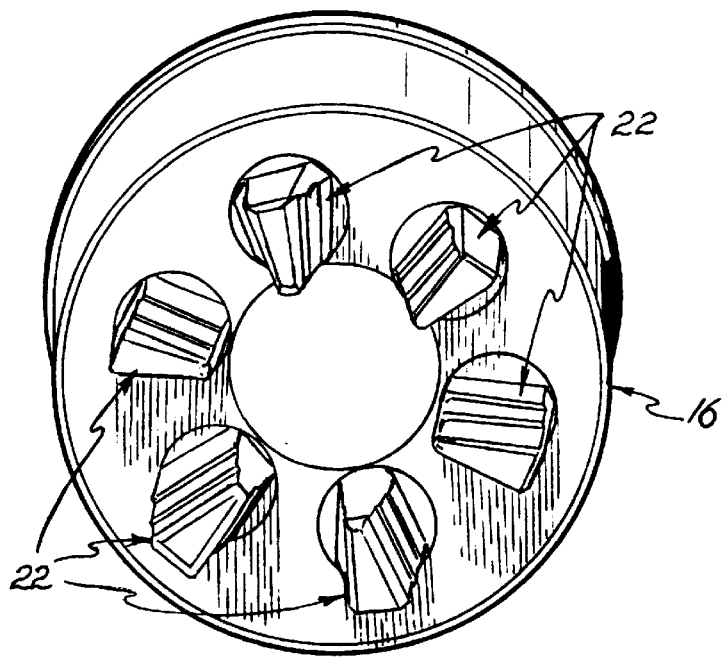
FIG. 2 is an end view of the tool of the present invention.
Figure 3:
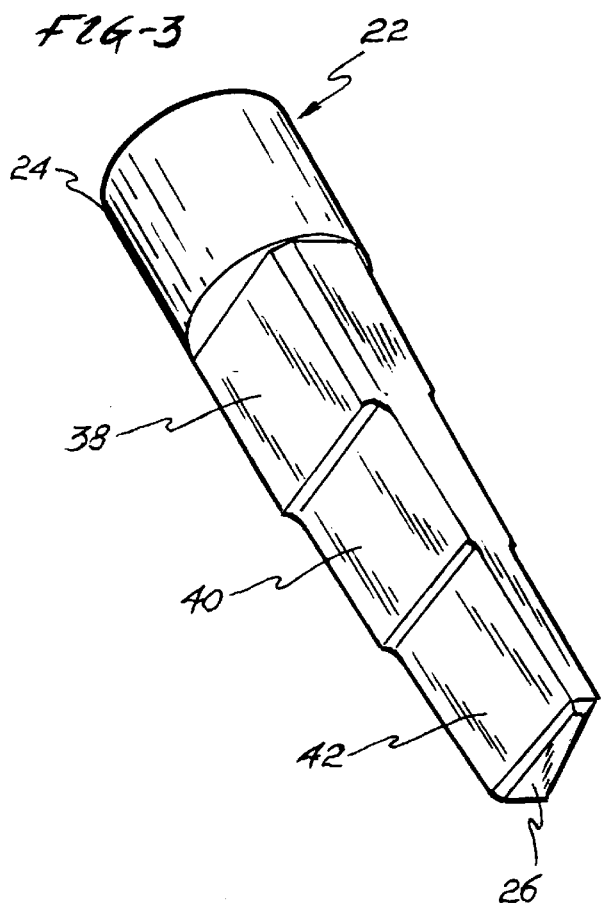
FIG. 3 is a perspective view of an elongated finger portion of the tool.
Figure 4:
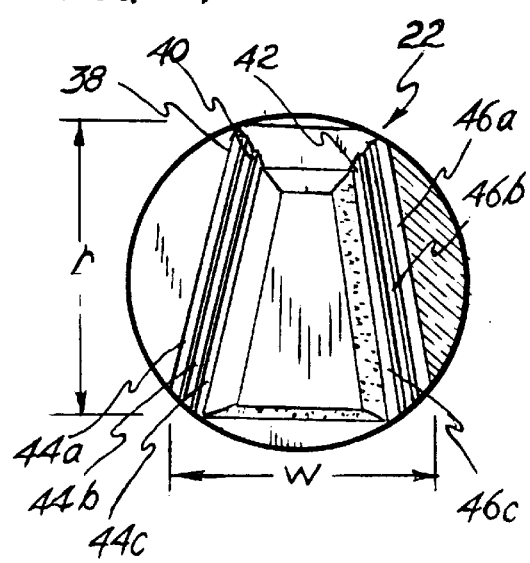
FIG. 4 is an end view thereof.

Referring to FIGS. 2–4, the elongated fingers 22 are located in circumferentially spaced relation around the fixture 16. The fingers 22 are formed with a plurality of longitudinally located sections including a first section 38, a second section 40 and a third section 42 wherein the first section 38 is formed integrally with the proximal end 24 which defines a circular cross section for mounting in a corresponding hole in the proximal end 18 of the fixture 16. The length of each section 38,40,42 is substantially equal to the height of the stator 14. Further, the fingers 22 are each formed with a wedge shaped cross section tapering inwardly toward the longitudinal center axis of the fixture 16, and in the embodiment shown, the fingers 22 have a trapezoidal cross section.

As best seen in FIG. 4, the fingers 22 include a width dimension w and a radial dimension r, perpendicular to the width dimension w, and each of the sections 38, 40, 42 is defined by respective pairs of sidewalls 44a, 46a, 44b, 46b and 44c, 46c. The sidewalls 44, 46 of the sections 38, 40, 42 are each substantially parallel to the longitudinal axis of the finger 22 and converge toward each other in the direction of the radial dimension r. In addition, the width dimension w or cross sectional area of the second section 40 is less than the width dimension w or cross sectional area of the first section 38, and the width dimension or cross sectional area of the third section 42 is less than the width dimension or cross sectional area of the second section 40. Thus, the width dimensions of each successive section 38, 40, 42 in the longitudinal direction of the finger 22 successively decreases from the proximal end 24 to the distal end 26 of the finger 22.

Figure 5:
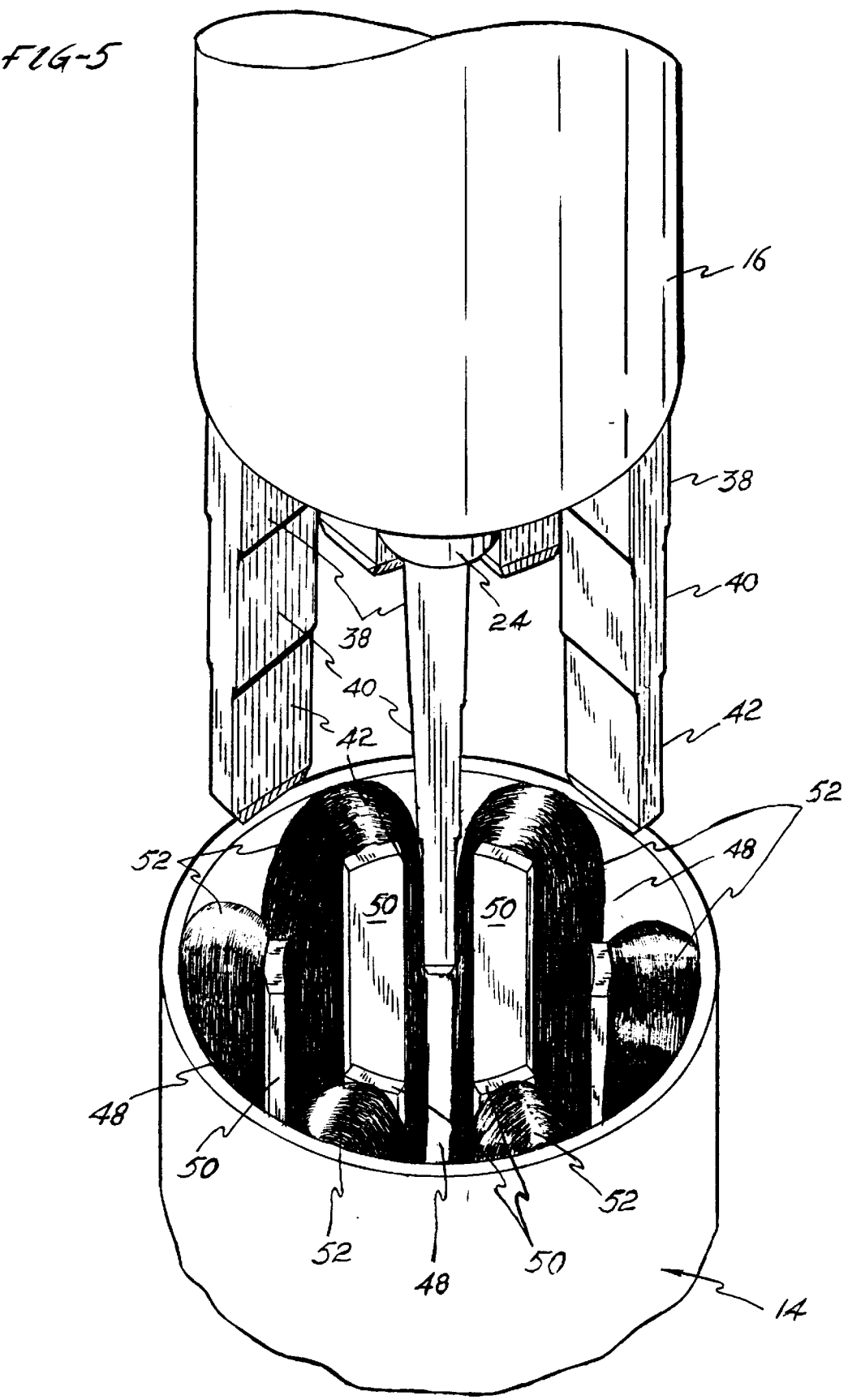
FIG. 5 is a perspective view showing the tool just prior to insertion through a stator.

The converging or wedge shape of the fingers 22 is provided to permit the fingers to conform to the shape of slots 48 (FIG. 5) defined by the radially extending teeth 50 of a stator 14. As seen in FIG. 5, a finger 22 is provided for positioning within each of the slots 48 of the stator 14 in order to form or drift the winding wire 52 located around the teeth 50 and thereby provide additional space within the slot 48 for winding additional wire onto the stator 14.

Referring to FIGS. 6–8, the steps for using the tool of the present invention are illustrated. As seen in FIG. 6, after an initial layer of winding wire 52 is provided on the teeth 50, the elongated finger 22 is inserted such that the second and third sections 40, 42 extend past the slot 48 and the wider first section 38 is positioned within the slot with the side surfaces 44a and 46a in contact with the windings 52 to thereby position the windings in close engagement with the teeth 50. Subsequently, the elongated finger 22 is withdrawn and additional windings are applied around the teeth 50 by a winding apparatus. After a predetermined number of additional windings have been placed around the teeth 50, the elongated finger 22 is again actuated for linear movement into the slot 48 to position the second section 40 within the slot with the side surfaces 44b, 46b in engagement with the windings 52, as illustrated in FIG. 7.

Finally, after the tool 22 has been withdrawn from the slot 48 and further windings have been applied around the teeth 50, the finger 22 is again moved toward the stator 14 to position the third section 42 in the slot 48 with the side surfaces 44c, 46c in engagement with the windings 52 to push or drift the windings into a compact position against the teeth 50.

In this manner, the slot fill capacity of the winding machine is increased whereby the number of windings which may be wound onto the stator 14 is increased. Further, it should be apparent that the tool of the present invention is designed such that it may be used in stages wherein different widths of the tool may be actuated into association with the stator 14 depending on the number of windings which have been applied. Also, by providing a number of fingers 22 corresponding to the number of slots 48 in the stator 14, it is possible to simultaneously operate on all of the stator windings at predetermined intervals in the winding process.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A tool for forming wire windings located in stator slots defined between radially extending stator teeth, said tool comprising:

an elongated finger having a proximal end and a distal end and a length dimension defined between said proximal end and said distal end, said finger defining a cross-section having a width dimension and a radial dimension perpendicular to the width dimension; and a plurality of sections defined along the length of said finger, each said section having a width dimension different than the width dimension of an adjacent section.

2. The tool of claim 1 wherein each said section has a longitudinal dimension along the length of said finger and said sections all have substantially the same longitudinal dimension.

3. The tool of claim 1 wherein each successive section defines a greater width dimension in a direction from said distal end toward said proximal end.

4. The tool of claim 1 wherein each section is defined by side surfaces spaced apart in the direction of the width dimension, and said side surfaces converge toward each other in the direction of the radial dimension.

5. The tool of claim 1 including a cylindrical fixture having a proximal end and a distal end wherein said proximal end of said finger is supported by said proximal end of said fixture.

6. The tool of claim 5 including a linear actuator having a bracket supporting said distal end of said fixture for actuating said fixture toward and away from a stator.

7. A tool for forming wire windings located in stator slots defined between radially extending stator teeth, said tool comprising:

a fixture having a proximal end, a distal end and a side surface facing radially outwardly and located between said proximal end and said distal end of said fixture;

at least one elongated finger having a proximal end and a distal end and a length dimension defined between said proximal end of said finger and said distal end of said finger said proximal end of said finger being mounted to said fixture at said proximal end of said fixture, and said finger defining a cross-section having a width dimension and a radial dimension perpendicular to the width dimension;

said at least one finger including side surfaces spaced apart in the direction of the width dimension wherein said side surfaces converge toward each other in the radial direction; and wherein said at least one finger includes a plurality of sections defined along the length thereof, each said section having a width dimension different than the width dimension of an adjacent section, and each section defined by a pair of side surfaces converging toward each other in the radial direction.

8. The tool of claim 7 including a plurality of fingers mounted to said fixture wherein each of said fingers is identical to said at least one finger.

9. A tool for forming wire windings located in stator slots defined between radially extending stator teeth, said tool comprising:

a fixture having a proximal end and a distal end;

a plurality of elongated fingers extending from said proximal end of said fixture, each said finger including a proximal end attached to said proximal end of said fixture and an opposite distal end;

each said finger defining a cross-section having a width dimension and a radial dimension perpendicular to said width dimension, and each said finger including a plurality of sections spaced longitudinally along the finger wherein each said section defines a width dimension different from the width dimension of an adjacent section, said width dimension of said sections increasing from said distal end to said proximal end of said fingers; and a linear actuator including a bucket supporting said distal end of said fixture for actuating said fixture toward and away from a stator whereby said fingers are inserted between teeth in the stator to cause wire wound around the teeth to be pressed against the teeth.

10. The tool of claim 9 wherein said fixture is cylindrical and said fingers are located in circumferentially spaced relation around said fixture.

11. The tool of claim 10 wherein each section is defined by side surfaces spaced apart in the direction of the width dimension and said side surfaces of each section converge toward each other in the direction of the radial dimension.

* * * * *

UNITED STATES PATENT AND TRADEMARK OFFICE
CERTIFICATE OF CORRECTION

PATENT NO. : 5,946,796
DATED : September 7, 1999
INVENTOR(S) : Jerry C. Burch

It is certified that error appears in the above-indentified patent and that said Letters Patent is hereby corrected as shown below:

At column 6, line 14, replace "bucket" with --bracket--.

Signed and Sealed this

First Day of February, 2000

Attest:

Q. TODD DICKINSON

Attesting Officer

Acting Commissioner of Patents and Trademarks